United States Patent
Sasaki

(10) Patent No.: US 9,594,785 B2
(45) Date of Patent: *Mar. 14, 2017

(54) DATABASE MANAGEMENT DEVICE AND DATABASE MANAGEMENT METHOD

(75) Inventor: Shigero Sasaki, Tokyo (JP)

(73) Assignee: NEC CORPORATION, Tokyo (JP)

(*) Notice: Subject to any disclaimer, the term of this patent is extended or adjusted under 35 U.S.C. 154(b) by 278 days.

This patent is subject to a terminal disclaimer.

(21) Appl. No.: 13/994,440

(22) PCT Filed: Nov. 7, 2011

(86) PCT No.: PCT/JP2011/006221
§ 371 (c)(1),
(2), (4) Date: Jun. 14, 2013

(87) PCT Pub. No.: WO2012/081165
PCT Pub. Date: Jun. 21, 2012

(65) Prior Publication Data
US 2013/0268484 A1    Oct. 10, 2013

(30) Foreign Application Priority Data
Dec. 16, 2010  (JP) ................. 2010-280397

(51) Int. Cl.
G06F 17/30 (2006.01)
(52) U.S. Cl.
CPC .............. *G06F 17/30327* (2013.01)
(58) Field of Classification Search
CPC ......... G06F 17/30327; G06F 17/30625; G06F 17/30961

USPC ........................................ 707/609
See application file for complete search history.

(56) References Cited

U.S. PATENT DOCUMENTS

| | | | |
|---|---|---|---|
| 6,047,283 A * | 4/2000 | Braun | |
| 6,584,458 B1 * | 6/2003 | Millett et al. | |
| 2008/0222090 A1 | 9/2008 | Sasaki | |
| 2009/0112905 A1 * | 4/2009 | Mukerjee et al. | 707/102 |
| 2012/0331008 A1 * | 12/2012 | Parida et al. | 707/798 |

FOREIGN PATENT DOCUMENTS

| | | | |
|---|---|---|---|
| JP | 5-334153 A | 12/1993 | |
| JP | 7-200376 A | 8/1995 | |
| JP | 2003-345832 A | 12/2003 | |
| JP | 2004-295790 A | 10/2004 | |

(Continued)

OTHER PUBLICATIONS

Douglas Comer, "The Ubiquitous B-Tree", Computing Surveys, Jun. 1979, pp. 121-137, vol. 11, No. 2.

(Continued)

*Primary Examiner* — Syed Hasan
*Assistant Examiner* — Saba Ahmed
(74) *Attorney, Agent, or Firm* — Sughrue Mion, PLLC

(57) ABSTRACT

A database management device includes plural index blocks having a tree structure and each having an access counter and at least one index entry for identifying one piece of row data constituting a table data or another index block, and an access management device that updates the access counter of each of the plural index blocks accessed along the tree structure, the access being made in a manner such that the index entry is referred to in response to data manipulation to the table data.

10 Claims, 11 Drawing Sheets

(56) References Cited

FOREIGN PATENT DOCUMENTS

| | | |
|---|---|---|
| JP | 2008-15810 A | 1/2008 |
| JP | 2008-225575 A | 9/2008 |
| JP | 2009-122850 A | 6/2009 |
| JP | 2010-140362 A | 6/2010 |

OTHER PUBLICATIONS

Michele Cyran, "Oracle Database Concepts", 10g Release 2, Part No. B19215-02, Mar. 2006 (FIGs. 5-7), 552, pgs. http://otndnld.oracle.co.jp/document/products/oracle10g/102/doc_cd/server.102/B19215-02.pdf.

Kathy Rich, "Oracle Database Reference", 10g Release 2, Part No. B19228-04, Jun. 2009 (FIGs. 5-7), 966 pgs. http://otndnld.oracle.co.jp/document/products/oracle10g/102/doc_cd/server.102/B19228-04.pdf.

Kotaro Kiwaki, "Ora, Ora, Oracle", Shoei-sha, May 2003 (pp. 199).

Ulrich Drepper, "What Every Programmer Should Know About Memory", Nov. 21, 2007, 114 pgs., http://people.redhat.com/drepper/cpumemory.pdf.

International Search Report for PCT/JP2011/006221 dated Dec. 13, 2011.

* cited by examiner

DATABASE MANAGEMENT DEVICE AND DATABASE MANAGEMENT METHOD

CROSS REFERENCE TO RELATED APPLICATIONS

This application is a National Stage of International Application No. PCT/JP2011/006221 filed Nov. 7, 2011, claiming priority based on Japanese Patent Application No. 2010-280397 filed Dec. 16, 2010, the contents of all of which are incorporated herein by reference in their entirety.

TECHNICAL FIELD

The present invention relates to a technique for managing database having tree-structured indexes added thereto.

BACKGROUND ART

It is very common to add indexes to data to rapidly search a large amount of data for a small amount of data. As the target for which the searching process is frequently performed, databases are used. Of the databases, a relational database that manages data in a tabular form is the most widely used. A table is formed by rows and columns, and for example, one row contains data concerning one transaction. The row is formed by plural columns, and for example, a certain column contains date data, while another column contains a sales amount.

In this case, the total sale amount at a specific date can be obtained, for example, through full scan or index scan. In the full scan, examination for all the rows is made as to whether the dates are matched or not, and the sales amounts in the matched rows are added up. In the index scan, the rows having the date matched with each other are specified using indexes, whereby the total of the sales amount can be obtained from the specified rows. This index scan is efficient when the number of rows having the date matched is sufficiently small as compared with the number of all the rows.

A B-tree is known as a data structure that accommodates the indexes. For example, Non-patent Document 1 describes algorithms including searching with the B-tree, inserting of data into the B-tree, and deleting data in the B-tree. Non-patent Document 2 makes an explanation of the B-tree in ORACLE (trademark) in relation to the widely used relational database.

With the B-tree index, it is possible to search for the data with the calculation amount in proportion to "log n", where n is the number of rows. Note that the amount of calculation in the full scan is proportion to the n.

RELATED DOCUMENT

Patent Document

Patent Document 1: Japanese Patent Application Laid-open No. 2008-15810
Patent Document 2: Japanese Patent Application Laid-open No. 2004-295790
Patent Document 3: Japanese Patent Application Laid-open No. 2008-225575
Patent Document 4: US Patent Application Laid-open No. 2008/222090
Patent Document 5: Japanese Patent Application Laid-open No. 2009-122850
Patent Document 6: Japanese Patent Application Laid-open No. 2010-140362
Patent Document 7: Japanese Patent Application Laid-open No. H07-200376

Non-Patent Document

Non-patent Document 1: Comer, D. "Ubiquitous B-Tree," ACM Computing Surveys, vol. 11, No. 2, p. 121-137, June 1979
Non-patent Document 2: "Oracle Database Concepts," 10g Release 2, Part number: B19215-02, March 2006 (FIGS. 5-7), http://otndnld.oracle.co.jp/document/products/oracle10g/102/doc_cd/server.102/ B19228-04.pdf
Non-patent Document 3: "Oracle Database Reference," 10g Release 2, Part number: B19228-04, June 2009 (FIGS. 5-7), http://otndnld.oracle.co.jp/document/products/oracle10g/102/doc_cd/server.102/B19215-02.pdf
Non-patent Document 4: "Ora, Ora, Oracle," written by Kotaro Kiwaki, published by Shoei-sha, May 2003 (pp. 199)
Non-patent Document 5: Drepper, U. What Every Programmer Should Know about Memory, November, 2007. http://people.redhat.com/drepper/cpumemory.pdf

SUMMARY OF THE INVENTION

In general, although the database having the B-tree indexes added thereto can be searched rapidly, the speed at which data are inserted and deleted is slow. This is because, for the database that does not have the B-tree indexes added thereto, it is only necessary to insert or delete data by manipulating the data stored simply as a table. However, at the time of inserting and deleting the data stored in the table having the B-tree indexes added thereto, the data stored in the B-tree also needs to be manipulated. Further, in the B-tree, there is a possibility that blocks themselves are added and deleted due to lack of the available area in the blocks to be manipulated. In such a case, it is necessary to manipulate the data in a block located in the upper layer.

Further, the increase in a difference between a speed of a central processing unit (CPU) and a memory speed has an effect on performances of the database. In particular, the latency of the memory increases at the time of random access, which results in a stall of the CPU during a wait time for access to the data in the memory. The random access as described above occurs, for example, at the time of performing a process of tracing a list, which frequently occurs in the database employing the B-tree indexes.

As described above, various factors such as processing methods and hardware affect the performance of the database. Currently, this makes it difficult to optimize the performance of the database. Further, there is no practical information that can be used to optimize the performance of the database.

An object of the present invention is to provide a database management technique for optimizing performance of a database having indexes with a tree structure added thereto.

Each aspect of the present invention employs the following configuration to solve the above-described problem.

A first aspect of the present invention relates to a database management device that manages a database containing a data block storing table data. The database management device according to the first aspect includes plural index blocks having a tree structure, and each having an access counter and at least one index entry for identifying one piece of row data constituting the table data or another index block, and an access management unit that updates the access counter of each of the index blocks accessed along the tree structure, the access being made in a manner such that the index entry is referred to in response to data manipulation to the table data.

A second aspect of the present invention provides a database management method that is performed by a computer and manages a database containing a data block storing a table data, the computer including plural index blocks having a tree structure, and each having an access counter and one piece of row data constituting the table data or at least one index entry for identifying another index block, and the method including referring to the index entry in response to data manipulation to the table data and updating the access counter of each of the plural index blocks accessed along the tree structure through the reference.

It should be noted that, as another aspect of the present invention, the present invention may provide a program that causes a computer to realize the configuration described above, or may provide a computer-readable storage medium storing this program.

According to each of the aspects of the present invention described above, it is possible to provide a database management technique for optimizing performance of the database having tree-structured indexes attached thereto.

DESCRIPTION OF EMBODIMENTS

Hereinbelow, embodiments of the present invention will be described.

A database management device according to this exemplary embodiment manages a database containing data blocks storing table data. This database management device includes: plural index blocks having a tree structure, and each having an access counter and at least one index entry for identifying one piece of row data constituting table data or another index block, and an access management unit that updates the access counter of each of the plural index blocks accessed along the tree structure, the access being made in a manner such that each of the index entries is referred to in response to data manipulation to the table data described above.

In the database management device, each of the index blocks having the tree structure is provided with the access counter. The updating is performed to the access counter of each of the plural index blocks accessed along the tree structure in response to one data manipulation performed to row data in the data block.

Thus, with the database management device, it is possible to obtain information on the number of accesses for each of the index blocks in the database having the indexes with the tree structure added thereto. The number of accesses to the index blocks often accounts for the large percentage in the number of accesses to all the blocks including the data blocks and the index blocks. The index blocks are usually retained in the memory. The access to the index blocks tends to be a bottleneck due to the difference in speeds between the central processing unit (CPU) and the memory. Thus, providing information on the access to the index blocks is significantly important to optimize the performance of the database.

Below, the exemplary embodiment described above will be described in further detail. Each exemplary embodiment described below is an example of a database system (hereinafter, referred to as a DB system) including the configuration of the database management device described above. Note that each of the exemplary embodiments described below is merely an example, and thus, the present invention is not limited to the configuration of the following exemplary embodiments.

[First Exemplary Embodiment]
[System Configuration]

Figure 1:
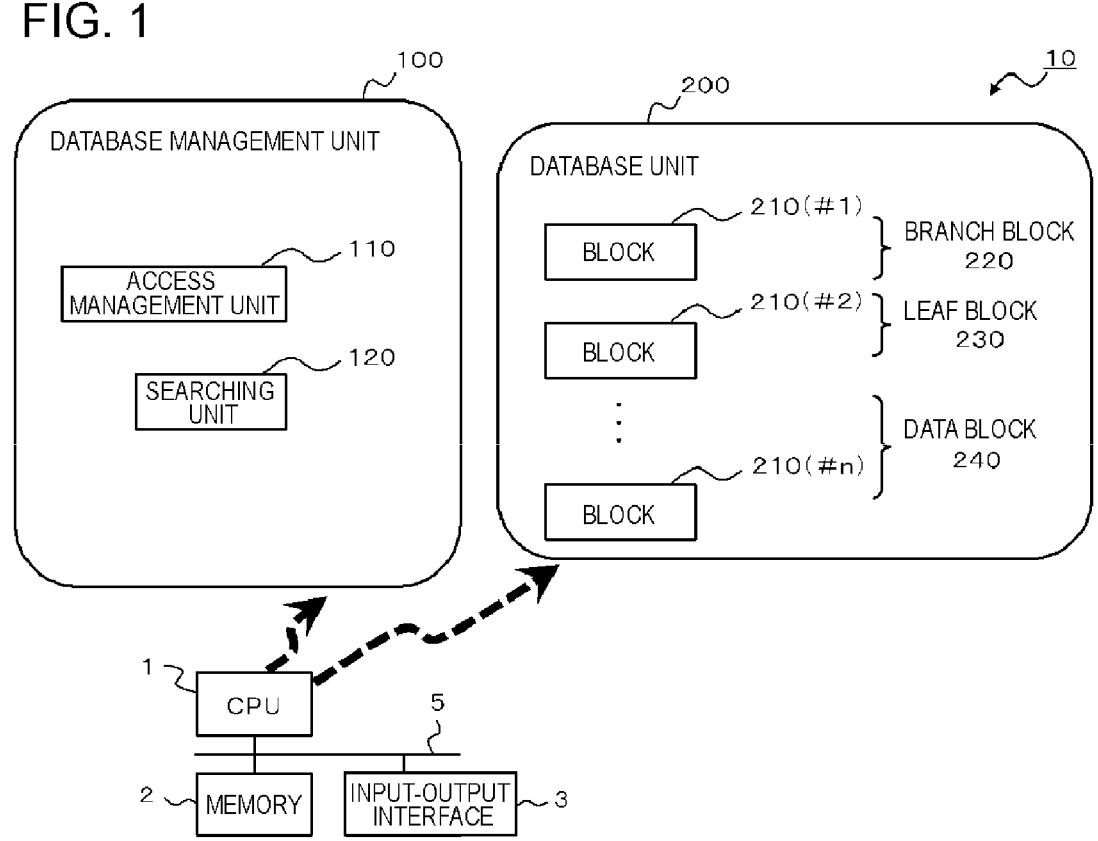
FIG. 1 is a schematic view illustrating an example of a configuration of a DB system according to a first exemplary embodiment.

FIG. 1 is a schematic view illustrating an example of a configuration of a DB system 10 according to a first exemplary embodiment. As illustrated in FIG. 1, the DB system 10 includes, as a hardware configuration, a CPU 1, a memory 2 (for example, a random access memory (RAM), a read only memory (ROM), and a hard disk drive (HDD)), and an input-output interface 3. These hardware elements are connected, for example, through a bus 5. The input-output interface 3 includes a network interface for communication with an external computer and a user interface.

The DB system 10 realizes the following processing units, for example, with the CPU 1 reading and running a program stored in the memory 2. The DB system 10 includes a database management unit (hereinafter, referred to as a DB management unit) 100, and a database (hereinafter, referred to as a DB) unit 200.

It should be noted that, in the example illustrated in FIG. 1, the DB system 10 is realized as one computer. However, the DB system 10 may be realized as plural computers. Further, in the example illustrated in FIG. 1, only one CPU 1 is provided. However, plural processors such as a CPU and a digital signal processor (DSP) may be provided. For example, the DB management unit 100 and the DB unit 200 may be realized on different computers or CPUs. This exemplary embodiment does not limit the hardware configuration of the DB system 10.

The DB unit 200 is realized on the memory 2, and includes plural blocks 210 (denoted by 210 (#1), 210 (#2), and 210 (#n) in FIG. 1). Each of the blocks 210 is secured, for example, as a continuous storage area having a predetermined volume (for example, 4 kilo bite (KB)). A portion between the blocks 210 may be secured as the continuous area, or may be secured as a discontinuous area. This exemplary embodiment does not limit the size of the area of each of the blocks 210.

The blocks 210 are generally categorized into blocks that store indexes (hereinafter, referred to as an index block) and blocks 240 that store data (hereinafter, referred to as a data block). The data block 240 stores a given table.

The index blocks each have a tree structure (for example, a B-tree (Balanced Tree) structure), and are generally categorized into branch blocks 220 and leaf blocks 230. The branch blocks 220 and the leaf blocks 230 each store at least one entry serving as an index. The entry stored in each of the index blocks may be called an index entry. The index entry includes a key value serving as a searching target and an identifier (ID).

The leaf block 230 is the block that belongs to the lowest layer of all the index blocks. An identifier contained in the entry of each of the leaf blocks is data for identifying any one piece of row data in the data block. The identifier is formed, for example, by a pointer that indicates a head of the row data to be identified, and the size of the row data.

The branch block 220 is a block that has a link to the leaf block 230 or another branch block 220. This link is realized by the identifier of the index entry. More specifically, the identifier contained in the entry of the branch block 220 is a pointer for identifying any one of the branch blocks 220 or any one of the leaf blocks 230. Hereinafter, the branch blocks 220 on the highest layer is also referred to as a root block. In this specification, the highest layer represents a layer that is searched first during searching process.

Hereinafter, in each of the index blocks linked with the identifier in the index entry, the branch block 220 containing the index entry is also referred to as a parent block, and the leaf block 230 identified on the basis of the identifier in the index entry or another branch block 220 is also referred to as a child block.

Figure 2:
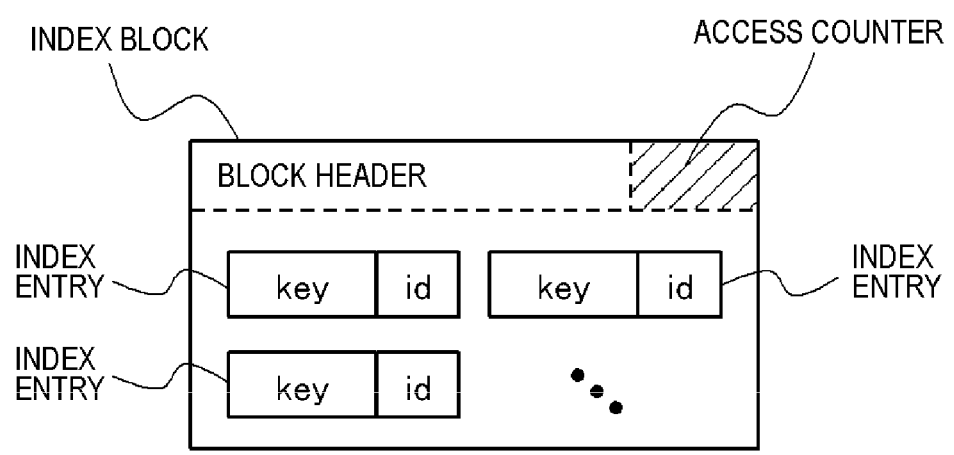
FIG. 2 is a schematic view illustrating an example of a configuration of an index block according to the first exemplary embodiment.

FIG. 2 is a schematic view illustrating an example of a configuration of the index block according to the first exemplary embodiment. As illustrated in FIG. 2, each of the index blocks contains a block header and at least one index entry. As described above, the index entry contains a key value ("key" in FIG. 2) and an identifier ("id" in FIG. 2). The block header has, for example, a block type and an access counter set therein. The block type is information, for example, for identifying the leaf block and the branch block. The access counter counts the number of accesses to the index block.

FIG. 2 gives an example in which the continuous area in the index block stores each value and each entry in the block header. However, each value and each entry in the block header are not necessarily stored in the continuous area, provided that the value and the entry are associated with each other.

The DB management unit 100 includes, for example, an access management unit 110, and a searching unit 120. Each of the processing units constituting the DB management unit 100 is also realized as a software element with the CPU 1 reading and running a program stored in the memory 2.

The searching unit 120 acquires a search key, and extracts, from the data block 240, a row containing data on a column (field) corresponding to the acquired search key. This search key may be acquired through communication from another device, or may be acquired from another processing unit such as a process run by the CPU 1, or may be acquired from a user through a user interface.

The searching unit 120 performs an index search to identify the row to be extracted from the data block 240. In this index search, the searching unit 120 first accesses a root block. Of the entries contained in the root block, the searching unit 120 searches for an entry having the maximum key value but less than or equal to the search key, or an entry having the minimum key value but more than or equal to the search key.

The searching unit 120 reads the other branch block 220 or the leaf block 230 identified on the basis of the identifier in the extracted entry. In the case where the other branch block 220 is read, the searching unit 120 extracts a specific entry as is the case with the searching of the root block described above. On the other hand, in the case where the leaf block 230 is read, the searching unit 120 extracts an entry that satisfies conditions of the search key, and extracts, from the data block 240, row data identified on the basis of the identifier of the entry.

The access management unit 110 operates in accordance with an instruction from the searching unit 120, and increases the access counter of the block header in the index block serving as the target. More specifically, when the searching unit 120 performs the index search to read out the branch block 220 or the leaf block 230 identified on the basis of the identifier in the index entry, the access management unit 110 increases the access counter of the block header in the read out index block. However, since the root block is a block that is looked up first, the searching unit 120 increases the access counter of the block header in the root block at the time of access.

When the searching unit 120 reads the branch block 220 indicated by the identifier in any of the entries in the root block, the access management unit 110 increases the access counter of this branch block 220 by one. Further, when the searching unit 120 accesses the leaf block 230 traced from this branch block 220, the access management unit 110 increases the access counter of this leaf block 230 by one.

[Example of Operation]

Figure 3:
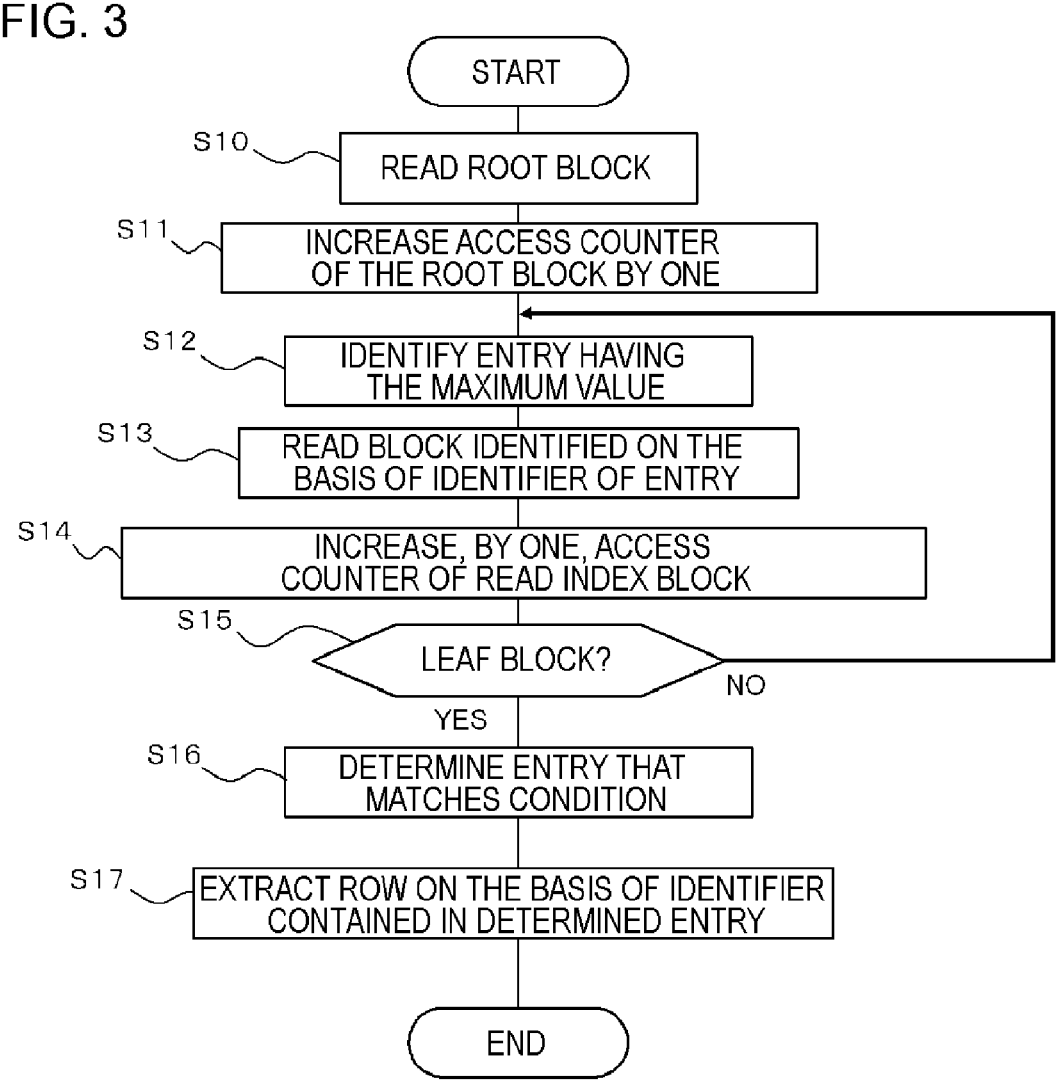
FIG. 3 is a flowchart showing an example of an operation performed by the DB system according to the first exemplary embodiment.
Figure 4:
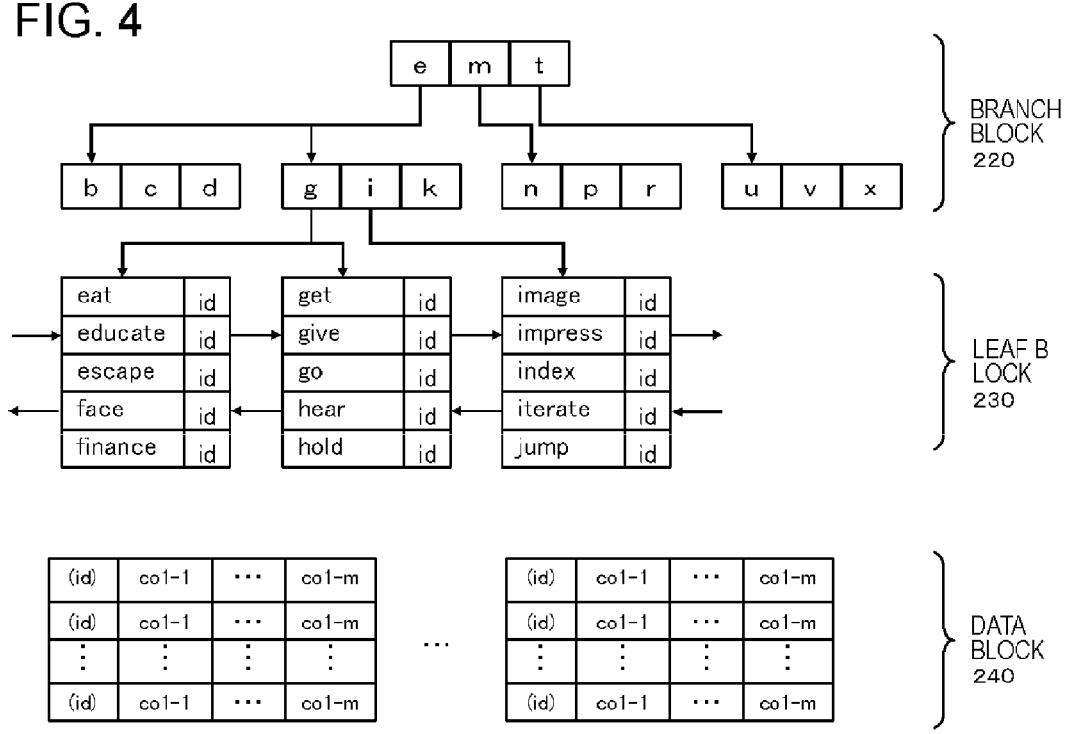
FIG. 4 is a schematic view illustrating an example of a relationship between a branch block, a leaf block, and a data block.

Described below is an example of an operation of the DB system 10 according to the first exemplary embodiment with reference to FIG. 3 and FIG. 4. FIG. 3 is a flowchart showing an example of an operation performed by the DB system 10 according to the first exemplary embodiment. In the example illustrated in FIG. 3, operations performed at the time of a perfect matching search are shown. FIG. 4 is a schematic view illustrating an example of a relationship between the branch block 220, the leaf block 230, and the data block 240. With reference to FIG. 4, the example of the operation will be described by giving an example in which the searching unit 120 searches for a row having a search key "go" contained in the column data on the assumption that the order of the character string is compared in dictionary order.

Upon acquiring a search key, the searching unit 120 reads out a root block (S10). In the example of FIG. 4, upon acquiring a search key "go", the searching unit 120 reads out a root block having index entries containing key values "e", "m" and "t".

Upon access to a root block by the searching unit 120, the access management unit 110 increases the access counter of the root block by one (S11).

Of the index entries in the root block, the searching unit 120 determines an entry having the maximum key value but less than or equal to this search key, or an entry having the minimum key value but more than or equal to this search key. The generality will not be lost if any of the determining methods described above is employed. Thus, in this exemplary embodiment, the searching unit 120 determines an entry having the maximum key value but less than or equal to the search key (S12). This determination of the entry may be realized by comparing all the entries in the blocks, or may be realized by sorting the entries in the blocks in terms of the key values and comparing part of the entries.

Although simplified, the example of FIG. 4 includes an entry containing a key value "e" and an entry containing a key value smaller than "e" (for example, NULL) for the key value "e". In this example, the maximum key value not more than the search key "go" is "e". The search key "go" is larger than the key value "e" and smaller than the key value "m", and hence, an entry containing an identifier that specifies the second branch block from the left end is determined.

Then, the searching unit 120 reads out the index block identified on the basis of the identifier of the entry as determined above (S13).

After the searching unit 120 reads out the index block, the access management unit 110 increases the access counter of the index block by one (S14).

The searching unit 120 judges, on the basis of the block type set in the block header, whether the read-out index block is the leaf block 230 or the branch block 220 (S15). If the read-out index block is judged to be the branch block 220 (NO in S15), the searching unit 120 and the access management unit 110 perform processes of S12, S13 and S14 in connection with the read-out branch block 220.

If the read-out index block is judged to be the leaf block 230 (YES in S15), the searching unit 120 determines an entry that matches the searching condition containing the search key from among the entries in the read-out leaf block 230 (S16). In this example, the searching condition indicates searching for a row having the column data containing the search key (perfect match). In the example of FIG. 4, an index entry containing the key value "go" is determined. This determination of the index entry may be realized by comparing all the entries in the leaf block 230, or may be realized by sorting the entries in the leaf block 230 in terms of the key values and comparing part of the entries.

The searching unit 120 extracts row data identified on the basis of the identifier contained in the determined index entry (S17). In the example of FIG. 4, a row of the data block 240 identified on the basis of the identifier in the index entry containing the key value "go" is extracted. For example, the head of the row data is determined using a pointer contained in the identifier, and data according to the size of the row (number of bites) from the head address are read out.

[Operation and Effect of First Exemplary Embodiment]

As described above, in the first exemplary embodiment, the access management unit 110 updates the access counter of each of the index blocks contained in the searching path traced in relation to the index search performed along the tree structure by the searching unit 120 until at least one piece of the row data in the data block 240 is extracted.

Thus, according to the first exemplary embodiment, the number of accesses to the branch block 220 and the leaf block 230 is recorded for each block at the time of searching. This makes it possible to easily estimate the access load for each block by looking up the access counter of each of the index blocks. With the estimation of the access load of each of the blocks, it is possible to optimize the performance of the database, for example, by determining an index block to be placed in a CPU cache according to its load.

It should be noted that, in the first exemplary embodiment, the number of accesses to the data block 240 is not counted. This is because the number of access per block of the data block 240 is low as compared with that of the index block. In the first exemplary embodiment, the number of access to the index block is counted as information useful in particular in optimizing the database performance. As described above, in the first exemplary embodiment, the load used in the process of counting the number of access is minimized. In this exemplary embodiment, the number of accesses to the data block 240 may be counted.

[Second Exemplary Embodiment]
[System Configuration]

Figure 5:
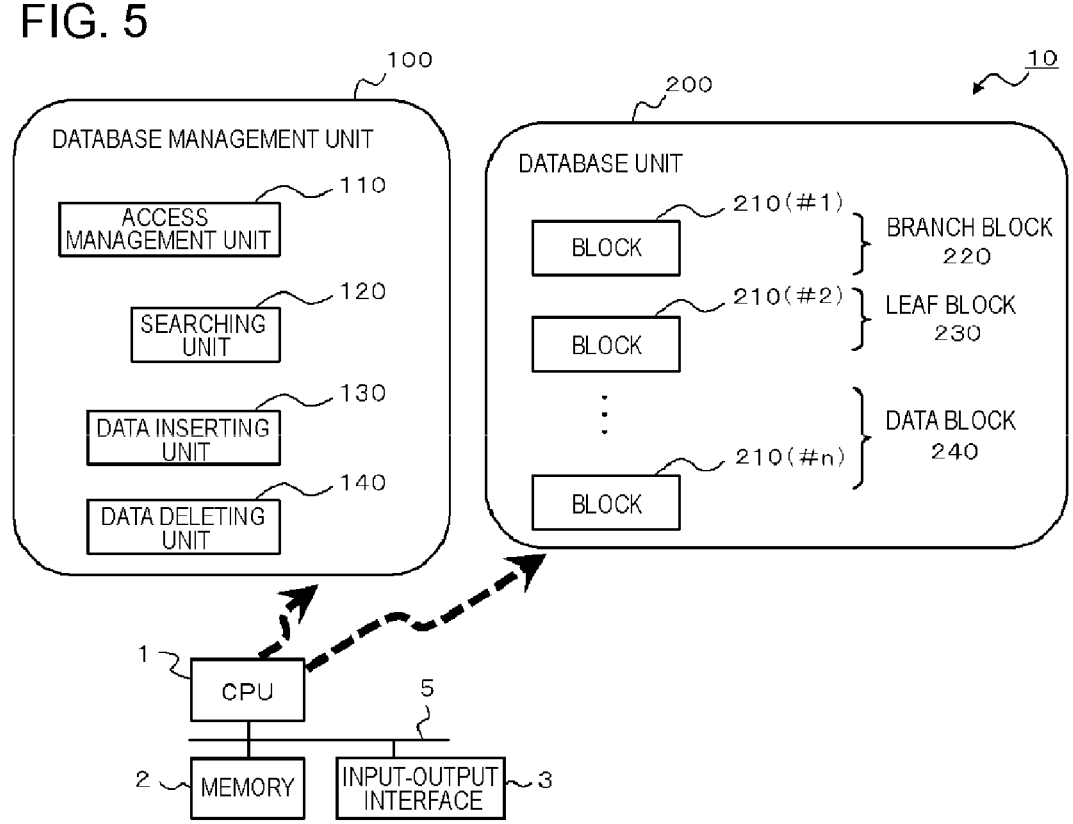
FIG. 5 is a schematic view illustrating an example of a configuration of a DB system according to a second exemplary embodiment.

FIG. 5 is a schematic view illustrating an example of a configuration of a DB system 10 according to a second exemplary embodiment. As illustrated in FIG. 5, in addition to the configuration of the first exemplary embodiment, the DB system 10 according to the second exemplary embodiment further includes a data inserting unit 130 and a data deleting unit 140. Below, the DB system 10 according to the second exemplary embodiment will be described with focus being placed on things different from the first exemplary embodiment, and the details same as the first exemplary embodiment will not be repeated. The data inserting unit 130 and the data deleting unit 140 are realized as a software element with the CPU 1 reading and running a program stored in the memory 2.

The data inserting unit 130 receives row data to be inserted, and writes the row data into the data block 240. At this time, the data inserting unit 130 updates an index in the index block on the basis of the inserted row data. The row data are written to the data block 240, for example, such that the row data are written into any one of the blocks having available areas of which size is larger than the row data to be inserted.

At the time of updating the index, the data inserting unit 130 at least adds, to a corresponding leaf block 230, a new index entry corresponding to the inserted row data. This new index entry contains, as the key value, column data located in columns having a key set therein and contained in the inserted row, and further contains an identifier for identifying the inserted row.

In updating the index, it may be request to add a new index entry to the branch block 220 in addition to adding the entry to the leaf block 230. This occurs in a case where the leaf block 230 serving as the insertion target does not have sufficient available areas for the new index entry to be added (in a case where overflow occurs).

In the case where the overflow occurs as described above, the data inserting unit 130 performs block division to create an available area. At the time of the block division, the data inserting unit 130 transfers part of the data of the leaf block 230 that uses up the available area having a predetermined capacity to a newly prepared leaf block 230 to create the available area. The block division is performed similarly in the branch block 220 as well as in the leaf block 230. Details of the block division will be described in Example of Operation.

The data deleting unit 140 receives a value used for identifying row data to be deleted, deletes the row data from the data block 240, and deletes an index entry corresponding to the deleted row data from the leaf block 230. For example, the value used for identifying the row data to be deleted is acquired as a result of the searching process performed by the searching unit 120.

In the case where the available area of the leaf block 230 becomes the predetermined size or more as a result of deleting the index entry from the leaf block 230 (in the case where underflow occurs), the data deleting unit 140 makes this leaf block 230 a blank block. Details of a process at the time of occurrence of this underflow will be described in Example of Operation.

Figure 6:
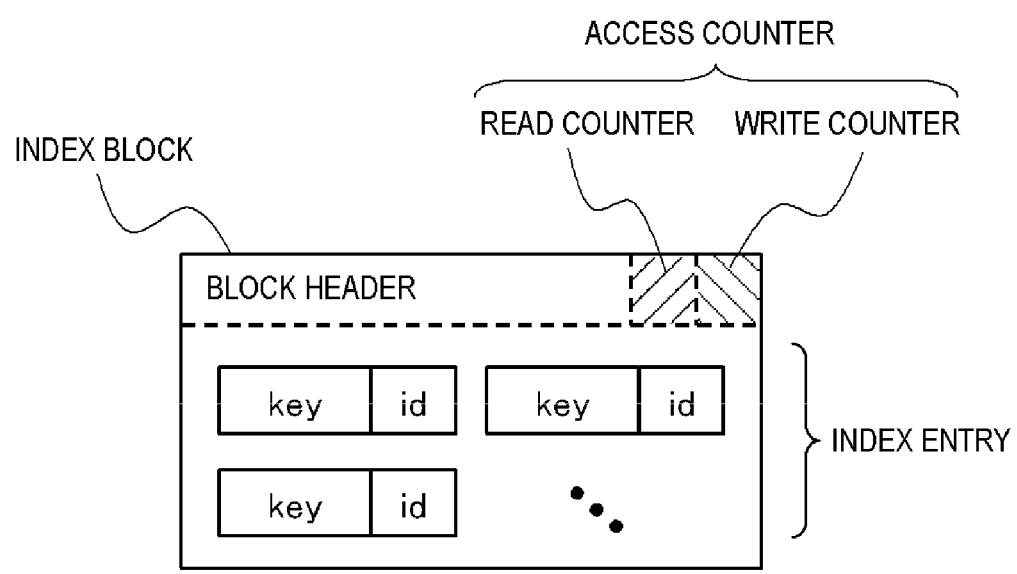
FIG. 6 is a schematic view illustrating an example of a configuration of an index block according to the second exemplary embodiment.

FIG. 6 is a schematic view illustrating an example of a configuration of the index block according to the second exemplary embodiment. As illustrated in FIG. 6, in the second exemplary embodiment, a read counter and a write counter are provided as the access counter. The read counter counts the number of read accesses, and the write counter counts the number of write accesses (including deleting the entry).

With this configuration, the access management unit 110 according to the second exemplary embodiment increases the read counter at the time of data searching described in the first exemplary embodiment. Further, when the data inserting unit 130 adds a new index entry at the time of inserting row data, the access management unit 110 increases, by one, the write counter of the index block having the index entry added thereto. At this time, the access management unit 110 increases, by one, the read counter of each of the index blocks that have been accessed until the index block having the index entry added thereto is obtained.

Similarly, in the case where the block division is performed to a row at the time of inserting row data, the access management unit 110 increases the read counter of the index block accessed in the block division process, and every time an entry is transferred in the block division process, increases, by one, the write counter of the index block serving as the transfer destination.

Further, in the case where the data deleting unit 140 deletes an entry from an index block, the access management unit 110 increases the write counter of the index block. Yet further, in the case where the data deleting unit 140 makes an index block a blank block, the access management unit 110 increases the write counter of the other index block serving as the transfer destination to which an entry is transferred to make the index block the blank block.

[Example of Operation]

Below, an example of an operation performed by the DB system 10 according to the second exemplary embodiment will be described with reference to FIG. 7 and FIG. 8.

Figure 7:
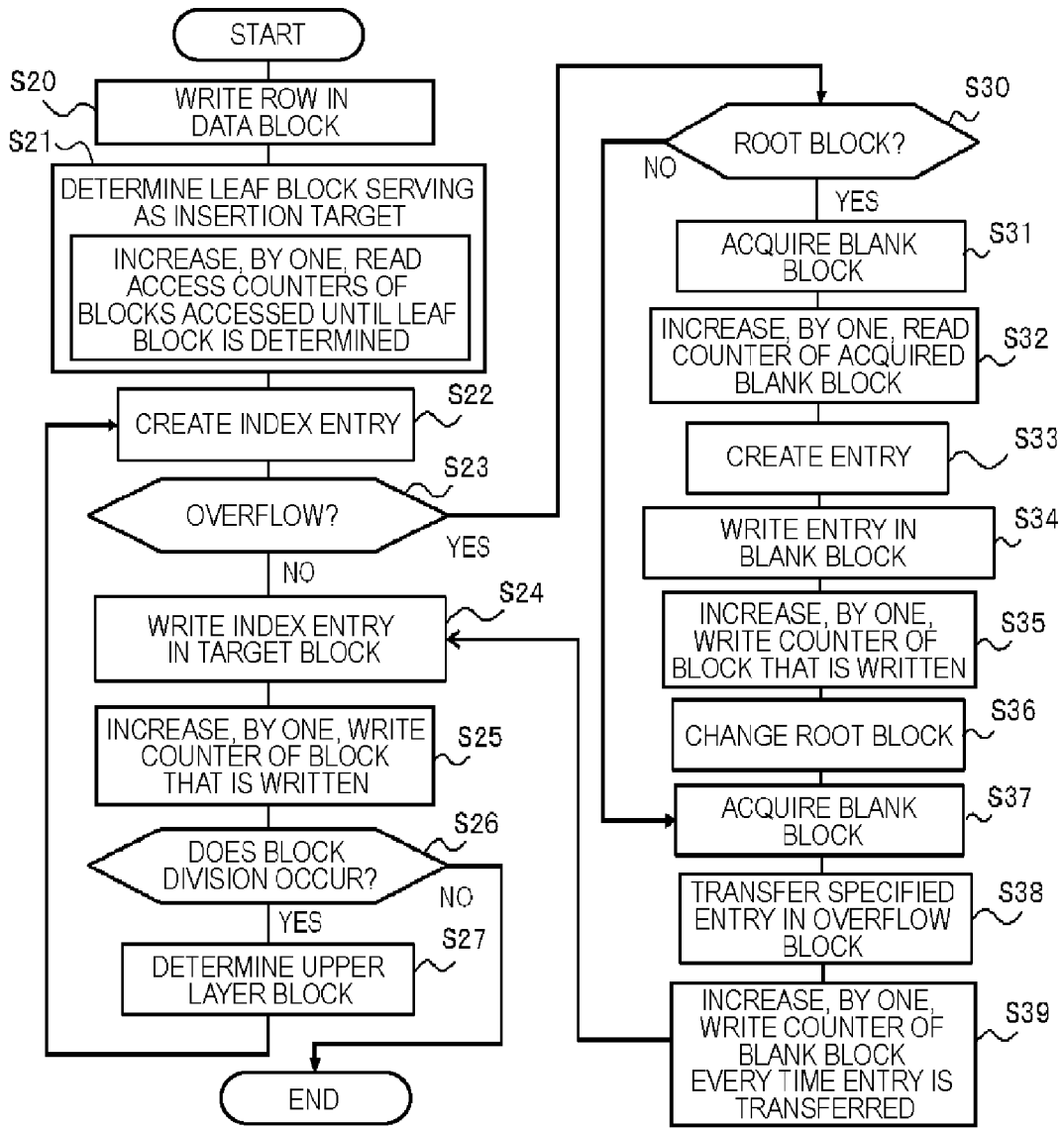
FIG. 7 is a flowchart showing an example of an operation performed at the time of inserting data in the DB system according to the second exemplary embodiment.

FIG. 7 is a flowchart showing an example of an operation performed by the DB system 10 according to the second exemplary embodiment at the time of inserting data.

Upon acquiring row data to be inserted, the data inserting unit 130 writes this row data to a given data block 240 having an available area (S20).

The data inserting unit 130 determines a leaf block 230 to which an index entry corresponding to the inserted row data is to be inserted (S21). This determination of the leaf block 230 is realized in a similar manner to the procedure performed in the case where the leaf block 230 is determined through the index search with the search key being the value of the column located in the inserted row data and having the key set therein. In the case of the example of the operation illustrated in FIG. 3, the leaf block 230 serving as the target of insertion is determined by performing the processes of S10, 511, S12, S13, S14, and S15.

Thus, the access management unit 110 increases the read counter of the index block read out to determine the leaf block 230 corresponding to the inserted row data.

Then, the data inserting unit 130 generates a new index entry to be inserted into the determined leaf block 230 (S22). The new index entry includes, as the key value, the value of the column located in the inserted row data and having the key set therein, and an identifier for identifying the inserted row data.

The data inserting unit 130 judges whether or not the addition of the new index entry causes the determined leaf block 230 to overflow (S23). In this specification, the overflow means that the available area of the block falls below a predetermined ratio as a result of adding the new index entry.

If judging that the leaf block does not overflow (S23; NO), the data inserting unit 130 writes the newly generated index entry into the determined leaf block 230 (S24). At this time, the access management unit 110 increases, by one, the write counter of the leaf block 230 into which the newly generated index entry is written (S25).

Then, the data inserting unit 130 judges whether the block division is performed (S26). If the block division is not performed (S26; NO), the data inserting unit 130 ends the process, whereas, if the block division is performed (S26; YES), the data inserting unit 130 determines a branch block located in the upper layer than the block subjected to the block division (S27). This determination of the branch block in the upper layer may be realized through processes using a recursive function, or may be realized by storing an identifier for the upper layer block in the block header.

After this, the data inserting unit 130 returns to the process S22 by using the determined upper layer branch block as the target block, and performs each of the processes.

If judging that the leaf block overflows (S23; YES), the data inserting unit 130 performs the block division process for the determined block. In this process, the data inserting unit 130 first judges whether or not the block that has been judged to overflow is a root block (S30).

If the block that has been judged to overflow is the root block (S30; YES), the data inserting unit 130 acquires a new blank block serving as a new root block (S31). At this time, the access management unit 110 increases, by one, the read counter of the acquired blank block (S32).

The data inserting unit 130 generates an index entry containing the minimum key value in the current root block that has been judged to overflow and an identifier for identifying this current root block (S33). The data inserting unit 130 writes the index entry as generated above in the blank block acquired to use it as the new root block (S34). In other words, the generated index entry serves as data for linking the new root block with the original root block (becomes a branch block thereafter).

At this time, the access management unit 110 increases, by one, the write counter of the block to which the index entry is written (S35).

Then, the data inserting unit 130 changes the root block (S36). More specifically, the data inserting unit 130 changes the root block from the original block that has been judged to overflow into the newly acquired block. This change is realized, for example, by changing the type of the block in the block header.

Next, the data inserting unit 130 further acquires a blank block (S37). The data inserting unit 130 determines entries that exist in the block judged to overflow and is to be transferred, and sequentially transfers the determined entries to the acquired blank block (S38). For example, the data inserting unit 130 holds a threshold value in advance, and determines an entry having a key value more than or equal to the threshold value to be a transfer entry from among entries in the block that has been judged to overflow. For the threshold value, a value less than key values of at least one entry such as a median value is used.

At this time, the access management unit 110 increases, by one, the write counter of the blank block every time the entry is transferred to the blank block (S39).

Then, the data inserting unit 130 writes an index entry generated in the process S22 in an available area created as a result of the transfer of the entry (S24). The data inserting unit 130 and the access management unit 110 perform processes after the process S25 described above.

Figure 8:
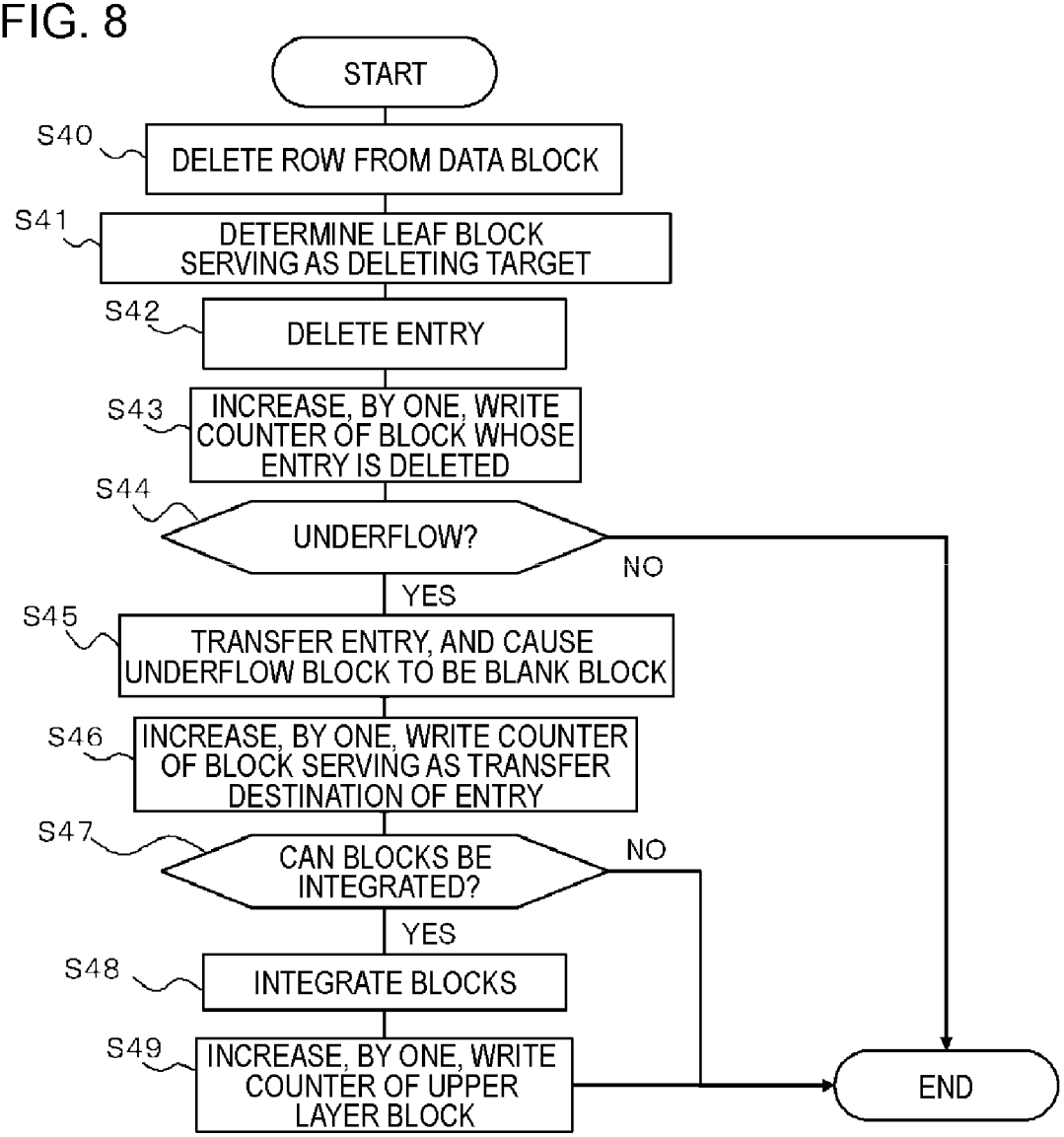
FIG. 8 is a flowchart showing an example of an operation at the time of deleting data in the DB system according to the second exemplary embodiment.

FIG. 8 is a flowchart showing an example of an operation performed when the DB system 10 according to the second exemplary embodiment deletes data.

The data deleting unit 140 receives a value for identifying row data to be deleted, and deletes the row data from the data block 240 (S40). The deletion of the row data may be realized by deleting data in a row, or may be realized by adding a value indicating invalid to the row data.

The data deleting unit 140 determines a leaf block 230 having an index entry that identifies the deleted row data (S41). This determination of the leaf block 230 is realized in a similar manner to the procedure performed in the case where the leaf block 230 is determined through the index search with the search key being the value of the column located in the deleted row data and having the key set therein. In the case of the example of the operation illustrated in FIG. 3, the leaf block 230 is determined by performing the processes of S10, S11, S12, S13, S14, and S15.

The data deleting unit 140 deletes the index entry corresponding to the deleted row data in the determined leaf block 230 (S42). At this time, the access management unit 110 increases the write counter of the leaf block 230 from which the index entry is deleted (S43).

The data deleting unit 140 judges whether or not the leaf block 230 underflows by deleting the entry (S44). If the underflow does not occur (S44; NO), the data deleting unit 140 ends the process.

If it is judged that the underflow occurs (S44; YES), the data deleting unit 140 transfers the entry remaining in the leaf block 230 judged to underflow to another leaf block 230, and makes the leaf block 230 become a blank block (S45). At this time, the access management unit 110 increases, by one, the write counter of the leaf block 230 serving as the destination of transfer of the entry (S46).

It should be noted that the blocks serving as destination of transfer may be one or may be plural, and the blocks may be selected through any methods. The data deleting unit 140 sets the access counters (the read counter and the write counter) of the leaf block 230 that becomes the blank block to be zero. By changing into the blank block, this block can be reused by the data inserting unit 130. Further, each of the access counters of the leaf block 230 that becomes the blank block may be integrated into access counters of the block serving as the destination of the transfer.

Then, the data deleting unit 140 judges whether or not the blocks can be integrated (S47). More specifically, the data deleting unit 140 judges whether or not all entries in all child blocks hanging from a parent block of the block that becomes the blank block can be transferred into this parent block (S47).

If it is judged that the blocks cannot be integrated (S47; NO), the data deleting unit 140 ends the process. On the other hand, if it is judged that the blocks can be integrated (S47; YES), the data deleting unit 140 integrates the blocks (S48). In other words, all the entries in the child block are transferred to the parent block while the entries existing in the parent block are deleted. As a result, all the child blocks hanging from the parent block are changed into the blank blocks.

At this time, the access management unit 110 increases, by one, the write counter of the upper block (S49). Note that the value of the access counters of the integrated child blocks may be integrated into the access counters of the parent block.

[Operation and Effect of Second Exemplary Embodiment]

As described above, in the second exemplary embodiment, in the case where the row data is inserted into the data block 240, the index entry for identifying the row data is added to the leaf block 230, and the write counter of this leaf block 230 is updated.

Further, the read counter of each of the index blocks referred to during index search performed for identifying the leaf block 230 to which the index entry is to be added is updated. Further, in the case where the block division occurs resulting from the insertion of the row data, the read counter of the newly acquired blank block is updated, and every time an entry is transferred, the write counter of the block is sequentially updated.

Further, in the second exemplary embodiment, in the case where row data is deleted from a data block 240, an index entry corresponding to the row data is deleted from the leaf block 230, and the write counter of the leaf block 230 from which the index entry is deleted is updated. Further, in the case where the leaf block 230 is judged to underflow as a result of deleting the entry, the write counter of the leaf block 230 serving as the destination of transfer of the entry, which is transferred at the time of creating a blank block, is updated. Further, in the case where blocks are integrated, the write counter of the integrated upper block is updated.

As described above, according to the second exemplary embodiment, it is possible to manage the number of accesses to each of the blocks while the read access and the write access are distinguished from each other. Even if the accesses are the same, the read access and the write access are different in their loads. This is because time required for access is different, and further, different types of locks are necessary.

Thus, according to the second exemplary embodiment, it is possible to provide information further useful in optimizing database performances by managing, for each index block, information on the number of accesses for each access type. With this information, it is possible to accurately estimate imbalance in access loads or access to child blocks in each index block, and further, identify a row for which efficiency can be improved and a row for which efficiency cannot be improved by the addition of an index to each of them.

More specifically, by using the read counter and the write counter provided to each index block and managed in the second exemplary embodiment, it is possible to determine whether to attach an index or not on a row-by-row basis. In the case where a tree index is attached, the searching rate can be increased. However, manipulation of indexes is necessary at the time of update, which reduces efficiency. As a result, it has been determined that it is less efficient to attach indices to a row identified on the basis of an entry of an index block having a write counter indicating a number more than or equal to a predetermined number.

[Third Exemplary Embodiment]

In a third exemplary embodiment, the access counters of each of the blocks are managed in a manner such that storage areas for storing each of the blocks are separated. Below, a DB system 10 according to the third exemplary embodiment will be described with focus being placed on things different from the exemplary embodiments described above, and explanation of the details same as those described in the exemplary embodiments will not be repeated.

[System Configuration]

Figure 9:
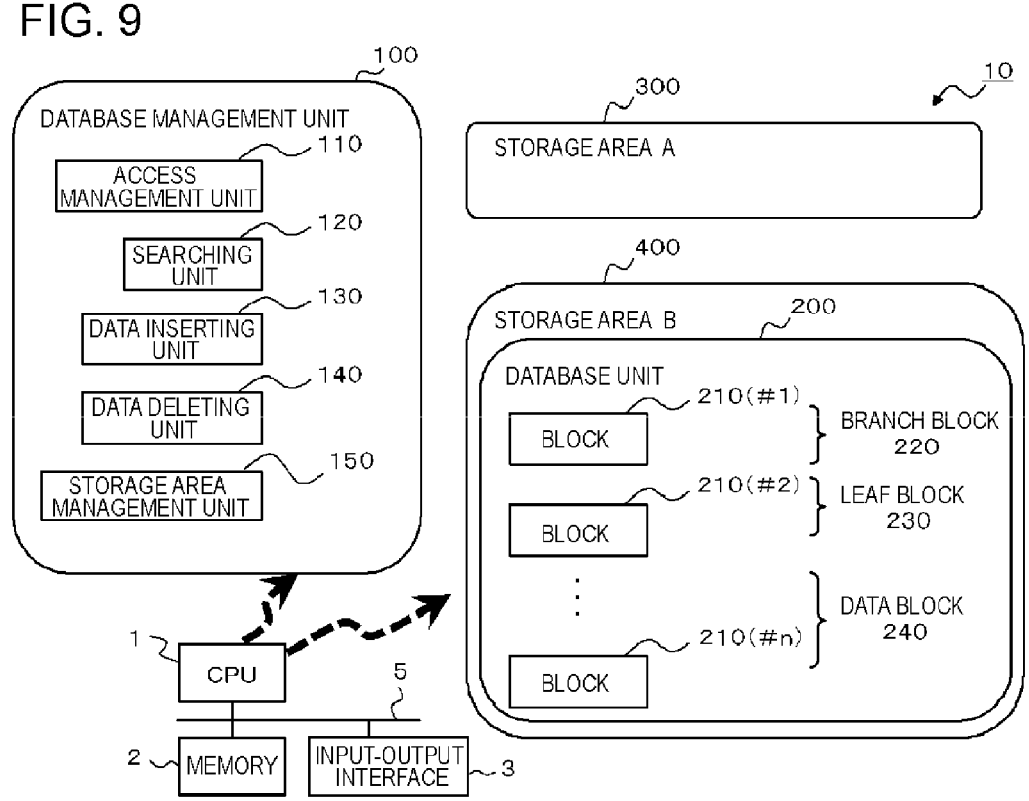
FIG. 9 is a schematic view illustrating a example of a configuration of a DB system according to a third exemplary embodiment.

FIG. 9 is a schematic view illustrating an example of a configuration of the DB system 10 according to the third exemplary embodiment. In the third exemplary embodiment, as illustrated in FIG. 9, plural storage areas (storage area A 300 and storage area B 400) are separately provided. For example, the storage area A 300 is realized on a memory device contained in the memory 2 and having a faster access speed, and the storage area B 400 is realized on a memory device contained in the memory 2 and having an access speed slower than that of the storage area A 300.

For example, the storage area A 300 is realized on a primary storage, and the storage area B 400 is realized on a secondary storage such as a hard disk. Note that the way of separating the storage area is not limited to the form described above, and it may be possible to separate the storage area for each type of the storage device such as a CPU cache, a flash memory, and a hard disk.

In addition to the configuration of the second exemplary embodiment, the DB system 10 according to the third exemplary embodiment further includes a storage area management unit 150. The storage area management unit 150 is realized as a software element by the CPU 1 reading and running a program stored in the memory 2.

The storage area management unit 150 manages the separated storage area A 300 and the separated storage area B 400. In this exemplary embodiment, the storage area A 300 is treated as a cache, and the storage area B 400 stores the entire DB unit 200. The storage area management unit 150 controls in a manner such that the searching unit 120, the data inserting unit 130, and the data deleting unit 140 can process without recognizing the storage area as being different ones.

The storage area management unit 150 stores, in the storage area A 300, a copy of each block partially constituting the DB unit 200 in the storage area B 400. Note that it is only necessary to perform this memory control with the storage area management unit 150 through a known cache technique, and thus, detailed explanation thereof will not be made herein.

Figure 10:
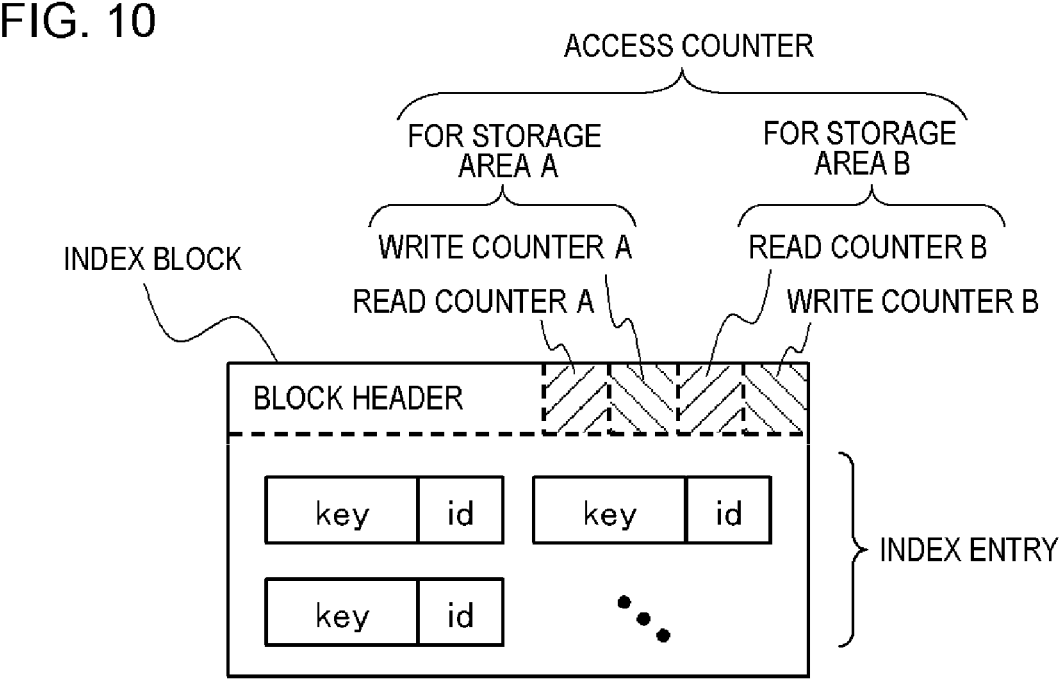
FIG. 10 is a schematic view illustrating an example of a configuration of an index block according to the third exemplary embodiment.

FIG. 10 is a schematic view illustrating an example of a configuration of an index block in the third exemplary embodiment. As illustrated in FIG. 10, in the index block according to the third exemplary embodiment, a pair of the write counter and the read counter is provided as the access counters for each of the storage areas.

The write counter A and the read counter A count accesses (cache hit) to the block stored in the storage area A 300, and the write counter B and the read counter B count accesses (cache miss) to each block duplicated from the storage area B 400 because the target is not present in the storage area A 300.

The access management unit 110 separates the storage area of the block that has been accessed, and updates the access counter for the separated storage areas. For example, in response to a notification of a cache miss from the storage area management unit 150, the access management unit 110 determines the storage area storing the block that is accessed for. Note that, in this exemplary embodiment, the method for determining the type of the memory device is not limited to that described above, and hence, it may be possible to employ any other known determination method.

[Operation and Effect of Third Exemplary Embodiment]

As described above, in this third exemplary embodiment, the access counters are provided for each of the storage areas (for each memory device), and at the time of access, the access counter corresponding to the storage area storing the index block accessed is updated.

Thus, according to the third exemplary embodiment, it is possible to take into consideration the effect of access to a storage medium other than a primary storage, for example, in the case where a block stored in a secondary storage such as a hard disk is duplicated on the primary storage before being manipulated. The time required for the access process differs depending on the type of the storage area in which the index block is stored, and hence, according to the third exemplary embodiment, it is possible to accurately estimate the access load as compared with the above-described exemplary embodiments. For example, in the third exemplary embodiment, the access load L can be obtained through calculation described below.

$$L = ar \times arc + aw \times awc + br \times brc + bw \times bwc$$

In this calculation, the ar and the aw represent a read load and a write load on the storage area A 300, respectively; the arc and the awc represent the number of read accesses and the number of write accesses on the storage area A 300, respectively; the br and the bw represent the read load and the write load on the storage area B 400, respectively; and the brc and the bwc represent the number of the read accesses and the number of the write accesses on the storage area B 400.

[Fourth Exemplary Embodiment]

In the exemplary embodiments described above, an example has been given in which the number of accesses for each block is managed. However, in a fourth exemplary embodiment, an example of using the number of accesses is described. Below, a DB system 10 according to the fourth exemplary embodiment will be described with focus being placed on things different from the exemplary embodiments described above, and explanation of the details same as those in the exemplary embodiments described above will be omitted as appropriate.

[System Configuration]

Figure 11:
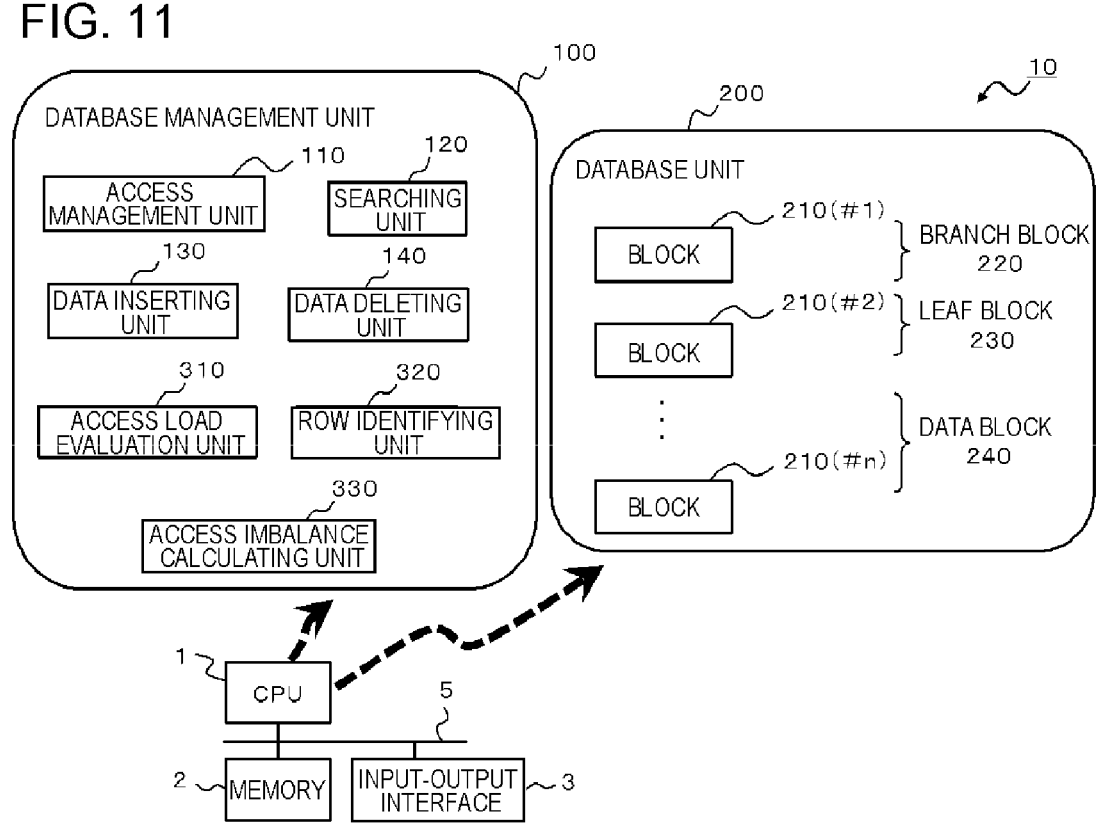
FIG. 11 is a schematic view illustrating an example of a configuration of a DB system 10 according to a fourth exemplary embodiment.

FIG. 11 is a schematic view illustrating an example of a configuration of the DB system 10 according to the fourth exemplary embodiment. In addition to the configuration of the second exemplary embodiment, the DB system 10 according to the fourth exemplary embodiment, the DB system 10 further includes an access load evaluation unit 310, a row identifying unit 320, and an access imbalance calculating unit 330. These processing units are also realized as software elements with the CPU 1 reading and running a program stored in the memory 2.

In the case where data for identifying a given index block are acquired, the access load evaluation unit 310 calculates an access load of an index block identified on the basis of the data, and outputs information indicating the calculated access load. At the time of calculating the access load, the access load evaluation unit 310 acquires a predetermined read load and a predetermined write load related to the identified index block, and reads access counters from a block header of the index block.

The access load evaluation unit 310 calculates the sum of the product of the predetermined read load and the number of the read accesses and the product of the predetermined write load and the number of the write accesses, and outputs the calculated value as the access load. Here, the read load and the write load represents the time required for processing one read access and the time required for processing one write access, respectively. Since the time required for processing accesses varies, the representative value thereof such as an average value and a median value is stored in the memory 2 for example, and the representative value is used as the read load and the write load.

Data for identifying a given index block may be acquired from another device through a communication, or may be acquired from another processing unit such as a process realized with the CPU 1, or may be inputted by a user through a user interface.

Without acquiring data for identifying a given index block, the access load evaluation unit 310 may output a list data in which pairs of an identifier for the index block and an access load of the index block are arranged in decreasing order from the higher access load.

The row identifying unit 320 identifies rows estimated to improve efficiency by the addition of indexes. More specifically, the row identifying unit 320 determines a leaf block 230 having the proportion of the number of write accesses to the number of all the accesses higher than a predetermined value. The row identifying unit 320 identifies a row on the basis of an index entry contained in the leaf block 230 determined as described above, and determines the identified row to be a row with which efficiency cannot be improved by the addition of index.

The row identifying unit 320 outputs a list of identifiers concerning the rows estimated to improve efficiency by adding indexes. Further, it may be possible to employ a configuration in which the row identifying unit 320 adds indexes only to the rows estimated to improve efficiency by adding the indexes, and deletes indexes from rows other than those described above. Further, the row identifying unit 320 may output a list in which the ratios of the numbers of write accesses relative to the total number of accesses are arranged in decreasing order from the highest ratio, and this list has a predetermined number of ratios arranged therein.

The access imbalance calculating unit 330 determines a branch block 220 with imbalanced access. In general, the branch block 220 has plural child blocks. In the case where access to the child blocks is unbalanced, this unbalanced access can be known by using the access counters of each of the child blocks. Thus, the access imbalance calculating unit 330 determines the predetermined number of branch blocks 220 counted from the highest degree of imbalance in a manner that the branch blocks 220 each having a child block accessed in an imbalanced manner are arranged in decreasing order from the highest degree of imbalance in terms of the number of read accesses, the number of write accesses, and the number of all the accesses.

It should be noted that this exemplary embodiment does not limit the method of calculating the degree of imbalance, and it is only necessary to employ various known methods. For example, in the case where access to specific child blocks accounts for a % of access to all the child blocks and the number of accesses to the specific child blocks accounts for x % (=100−a) of the number of accesses to all the child blocks, the imbalance may be calculated through a/x. More specifically, for example, in the case where a branch block 220 has 10 pieces of child blocks, and of the 10 pieces of child blocks, access to two pieces of child blocks accounts for 80% of access to all the 10 pieces of child blocks, the imbalance is 4 (=80/20).

The simplest method for calculating the imbalance is to fix any one of a and x. However, it may be possible to employ a method of calculating the imbalance by setting a range of either one of a and x such as $75<=a<=90$. With such a method, the value of the other one is set with respect to the value of the one for which the range has been set, (a/x) is calculated for the obtained pair, and the resulting maximum value is used as the imbalance.

Information outputted from the access load evaluation unit 310, the row identifying unit 320, and the access imbalance calculating unit 330 may be transmitted through the input-output interface 3 to another device (computer), or may be outputted from user interface such as a display device, or may be stored in the memory 2 in a manner such that the information is stored, for example, in a file. This exemplary embodiment does not limit the form of outputting the information described above.

[Operation and Effect of Fourth Exemplary Embodiment]

As described above, using the access counters for each of the blocks managed in the exemplary embodiments described above, the fourth exemplary embodiment employs outputs new information effective in optimizing the performance of the database. More specifically, the access load evaluation unit 310 outputs the information on the access load of each of the index blocks, the row identifying unit 320 outputs the information on the row estimated to improve efficiency by adding the indexes, and the access imbalance calculating unit 330 outputs the information on the branch block 220 having the unbalanced accesses.

For example, using the outputted information as described above, it is possible to determine whether to add indexes row by row. This leads to optimization of the database performance while taking into consideration all the manipulations to the database such as searching, inserting, and deleting. Further, by using the information on the unbalanced access and the access load information, it is possible to optimize the database performance such as re-design of the tree structure of the index blocks and determination of the index block to be placed in the cache with a high priority.

Further, with the information on the imbalance of access, it is possible to determine a particular branch block 220 and another branch block 220 or leaf block that is highly probable to be accessed following the particular branch block 220, in other words, it is possible to determine a relationship between blocks that are highly probable to be accessed in a row. With this configuration, for example, by arranging, in continuing storage areas, two index blocks that are highly probable to be accessed in a row, it is possible to increase the speed of processing as compared with the case where these are arranged in discontinuing storage areas.

In other words, according to the fourth exemplary embodiment, it is possible to provide information useful in optimizing the database performance.

MODIFICATION EXAMPLE

In the second exemplary embodiment, the third exemplary embodiment, and the fourth exemplary embodiment described above, the read counter and the write counter are provided as the access counter. However, in the second exemplary embodiment, the third exemplary embodiment and the fourth exemplary embodiment, the read counter and the write counter may be integrated, and be managed as one access counter, as in the first exemplary embodiment. Further, in the exemplary embodiments described above, the access counters (including the read counter and the write counter) are increased by one. However, this increase may be changed depending on types of access.

Further, the exemplary embodiments described above provide an example in which each entry contained in the index entries in the branch block 220 contains one identifier for identifying any one of the other branch blocks 220 or any one of leaf blocks 230. However, each entry may contain plural identifiers. For example, for an entry having the minimum key value in the branch block 220, this entry may contain an identifier for identifying a child block corresponding to a key value smaller than this minimum key value, and an identifier for identifying a child block corresponding to a key value not less than the minimum key value and less than the key value of the other entry.

It should be noted that the exemplary embodiments have been described with reference to plural flowcharts, and plural steps (processes) are described in a sequential order. However, the order of the steps is not necessarily limited to the order illustrated in the flowcharts. In the exemplary embodiments, the order of the process steps illustrated in the drawings may be exchanged, provided that such an exchange does not impair the details of the processes. Further, the above-described exemplary embodiments and the modification example may be combined, provided that the details thereof do not contradict each other.

Part or all of the exemplary embodiments and the modification example can be described in a manner illustrated in the Supplemental Notes below. However, the exemplary embodiments and the modification example are not limited to the descriptions below.

[Supplemental Note 1]

A database management device that manages a database containing a data block storing table data, including:

plural index blocks having a tree structure, and each having an access counter and at least one index entry for identifying one piece of row data constituting the table data or another index block; and an access management unit that updates the access counter of each of the plural index blocks accessed along the tree structure, the access being made in a manner such that the index entry is referred to in response to data manipulation to the table data.

[Supplemental Note 2]

The database management device according to Supplemental Note 1, further including a searching unit that searches the index entry in each of the index block along the tree structure to extract at least one piece of row data in the data block, in which, when the searching unit accesses any one of the plural index blocks, the access management unit increases the access counter of the index block that has been accessed, and then, when another index block identified on the basis of the index entry in the accessed index block is accessed, increases the access counter of said another other index block.

[Supplemental Note 3]

The database management device according to Supplemental Note 1 or 2, further including a data inserting unit that:

inserts a piece of new row data in the data block;

inserts, in an index block serving as an inserting target of the plural index blocks, a new index entry for identifying the row data inserted in the data block; and acquires a blank index block in the case where the new index entry cannot be inserted in the index block serving as the inserting target, in which the access counter includes a read counter and a write counter, and the access management unit increases the write counter of the index block in the case where the data inserting unit inserts the new index entry in the index block, and increases the read counter of the blank index block in the case where the data inserting unit acquires the blank index block.

[Supplemental Note 4]

The database management device according to Supplemental Note 3, in which the data inserting unit transfers at least one index entry in the index block serving as the inserting target to the blank index block, and inserts the new index entry in the index block serving as the inserting target, and the access management unit increases the write counter of the blank index block in the case where the data inserting unit transfers the at least one index entry to the blank index block.

[Supplemental Note 5]

The database management device according to Supplemental Note 3 or 4, further including a data deleting unit that:

deletes a piece of row data from the data block;

deletes an index entry corresponding to the deleted row data from the index block serving as a deleting target of the plural index blocks; and transfers an index entry remaining in the index block serving as the deleting target to another index block in the case where the index block serving as the deleting target is made a blank block, in which the access management unit increases the write counter of the index block serving as the deleting target in the case where the data deleting unit deletes the index entry from the index block serving as the deleting target, and increases the write counter of said another index block in the case where the data deleting unit causes the index block serving as the deleting target to be a blank block.

[Supplemental Note 6]

The database management device according to any one of Supplemental Notes 3 to 5, further including an access load evaluation unit that:

acquires read load information and write load information, each of which concerns a specified index block of the plural index blocks; and calculates, as an access load of the specified index block, a sum of a product of the read counter of the specified index block and the read load information concerning the specified index block, and a product of the write counter of the specified index block and the write load information concerning the specified index block.

[Supplemental Note 7]

The database management device according to any one of Supplemental Notes 3 to 6, further including a row identifying unit that identifies an index block having a write counter whose percentage accounts for the predetermined value or more with respect to the number of all the accesses.

[Supplemental Note 8]

The database management device according to any one of Supplemental Notes 1 to 7, further including an access imbalance calculating unit that:

concerning a parent index block storing plural index blocks for identifying plural child index blocks, calculates imbalance of the number of accesses to a specific child index block with respect to the number of accesses to all the child index block on the basis of an access counter of each of the plural child index blocks; and outputs information for identifying a predetermined number of parent index blocks, the identified parent index blocks being selected in decreasing order from the parent index block having the highest imbalance.

[Supplemental Note 9]

The database management device according to any one of Supplemental Notes 1 to 8, in which the access counter is formed by plural access counters so as to corresponding to plural storage areas, respectively, and in the case where there occurs an access to any one of the plural index blocks, the access management unit updates an access counter belonging to the index block that has been accessed and corresponding to a storage area serving as a destination of the access.

[Supplemental Note 10]

A program that manages a database containing a data block storing table data and causes a computer to function as:

plural index blocks having a tree structure, and each having an access counter and at least one index entry for identifying one piece of row data constituting the table data or another index block; and an access management unit that updates the access counter of each of the plural index blocks accessed along the tree structure, the access being made in a manner such that the index entry is referred to in response to data manipulation to the table data.

[Supplemental Note 11]

The program according to Supplemental Note 10 that causes a computer to further function as:

a searching unit that searches the index entry in each of the index block along the tree structure to extract at least one piece of row data in the data block, in which when the searching unit accesses any one of the plural index blocks, the access management unit increases the access counter of the index block that has been accessed, and then, when another index block identified on the basis of the index entry in the accessed index block is accessed, increases the access counter of said another index block.

[Supplemental Note 12]

The program according to Supplemental Note 10 or 11 that causes a computer to further function as a data inserting unit that:

inserts a piece of new row data in the data block;

inserts, in an index block serving as an inserting target of the plural index blocks, a new index for identifying the row data inserted in the data block; and acquires a blank index block in the case where the new index entry cannot be inserted in the index block serving as the inserting target, in which the access counter includes a read counter and a write counter, and the access management unit increases the write counter of the index block in the case where the data inserting unit inserts the new index entry to the index block, and increases the read counter of the blank index block in the case where the data inserting unit acquires the blank index block.

[Supplemental Note 13]

The program according to Supplemental Note 12, in which the data inserting unit transfers at least one index entry in the index block serving as the inserting target to the blank index block, and inserts the new index entry in the index block serving as the inserting target, and the access management unit increases the write counter of the blank index block in the case where the data inserting unit transfers the at least one index entry to the blank index block.

[Supplemental Note 14]

The program according to Supplemental Note 12 or 13 that causes a computer to further function as:

data deleting unit that:

deletes a piece of row data from the data block;

deletes an index entry corresponding to the deleted row data from the index block serving as a deleting target of the plural index block; and transfers an index entry remaining in the index block serving as the deleting target to another index block in the case where the index block serving as the deleting target is made a blank block, in which the access management unit increases the write counter of the index block serving as the deleting target in the case where the data deleting unit deletes the index entry from the index block serving as the deleting target, and increases the write counter of said another index block in the case where the data deleting unit causes the index block serving as the deleting target to be a blank block.

[Supplemental Note 15]

The program according to any one of Supplemental Notes 12 to 14 that causes a computer to further function as:

an access load evaluation unit that:

acquires read load information and write load information, each of which concerns a specific index block of the plural index blocks; and calculates, as an access load of the specified index block, a sum of a product of the read counter of the specified index block and the read load information concerning the specified index block, and a product of the write counter of the specified index block and the write load information concerning the specified index block.

[Supplemental Note 16]

The program according to any one of Supplemental Notes 12 to 15 that causes a computer to further function as:

a row identifying unit that identifies an index block having the write counter whose percentage of access relative to the number of all the accesses is higher than a predetermined value.

[Supplemental Note 17]

The program according to any one of Supplemental Notes 10 to 16 that causes a computer to further function as:

an access imbalance calculating unit that:

concerning a parent index block storing plural index blocks for identifying plural child index blocks, calculates imbalance of the number of accesses to a specific child index block with respect to the number of accesses to all the child index block on the basis of an access counter of the plural child index blocks; and outputs information for identifying a predetermined number of parent index blocks, the identified parent index blocks being selected in decreasing order from the parent index block having the highest imbalance.

[Supplemental Note 18]

The program according to Supplemental Notes 10 to 17, in which the access counter is formed by plural access counters so as to corresponding to plural storage areas, respectively, in the case where there occurs an access to any one of the plural index blocks, the access management unit updates an access counter belonging to the index block that has been accessed and corresponding to a storage area serving as a destination of access.

[Supplemental Note 19]

A database management method that is performed by a computer and manages a database containing a data block storing table data, the computer including plural index blocks having a tree structure, and each having an access counter and at least one index entry for identifying one piece of row data constituting the table data or another index block, and the database management method including:

referring to the index entry in response to data manipulation to the table data; and updating the access counter of each of the plural index blocks accessed along the tree structure through the reference to the index entry.

[Supplemental Note 20]

A computer-readable storage medium that stores the program according to any one of Supplemental Notes 10 to 18.

The present application claims priority based on Japanese Patent Application No. 2010-280397 filed in Japan on Dec. 16, 2010, the disclosures of which are incorporated herein by reference in their entirety.

The invention claimed is:

1. A database management device that manages a database containing a data block storing table data, comprising:

a storage device storing a plurality of index blocks each of which is stored in a different contiguous storage space of a predetermined size from each other and includes a plurality of index entries, each of the index entry identifying one piece of row data of the table data or indentifying another index block, the plurality of index blocks constituting a tree structure, each of the index block being either a branch node or a leaf node of the tree structure, the storage device further storing an access counter for each index block that indicates a number of accesses to the corresponding index block; and an access management unit that updates the access counter of each of the index blocks accessed along the tree structure, said access being made in a manner such that the index entry is referred to in response to data manipulation to the table data.

2. The database management device according to claim 1, further comprising a searching unit that searches the index entry in each of the index blocks along the tree structure to extract at least one piece of row data in the data block, wherein when the searching unit accesses any one of the plurality of index blocks, the access management unit increases the access counter of the index block that has been accessed, and then, when another index block identified based on the index entry in the accessed index block is accessed, increases the access counter of said another index block.

3. The database management device according to claim 1, further comprising:

a data inserting unit that:

inserts a piece of new row data in the data block;

inserts, in an index block serving as an inserting target of the plurality of index blocks, a new index entry for identifying the row data inserted in the data block; and acquires a blank index block in a case where the new index entry cannot be inserted in the index block serving as the inserting target, wherein the access counter includes a read counter and a write counter, and the access management unit increases the write counter of the index block in a case where the data inserting unit inserts the new index entry in the index block, and increases the read counter of the blank index block in a case where the data inserting unit acquires the blank index block.

4. The database management device according to claim 3, further comprising a data deleting unit that:

deletes a piece of row data from the data block;

deletes an index entry corresponding to the deleted row data from the index block serving as a deleting target of the plurality of the index blocks; and transfers an index entry remaining in the index block serving as the deleting target to another index block in a case where the index block serving as the deleting target is made a blank block, wherein the access management unit increases the write counter of the index block serving as the deleting target in a case where the data deleting unit deletes the index entry from the index block serving as the deleting target, and increases the write counter of said another index block in a case where the data deleting unit causes the index block serving as the deleting target to be a blank block.

5. The database management device according to claim 3, further comprising an access load evaluation unit that:

acquires read load information and write load information, each of which concerns a specified index block of the plurality of index blocks; and calculates, as an access load of the specified index block, a sum of a product of the read counter of the specified index block and the read load information and a product of the write counter of the specified index block and the write load information.

6. The database management device according to claim 3, further comprising a row identifying unit that identifies an index block having a write counter whose percentage accounts for the predetermined value or more with respect to the number of all the accesses.

7. The database management device according to claim 1, further comprising an access imbalance calculating unit that:

concerning a parent index block storing a plurality of index blocks for identifying a plurality of child index blocks, calculates imbalance in the number of accesses to a specific child index block with respect to the number of accesses to all the child index blocks based on an access counter of each of the plurality of child index blocks; and outputs information for identifying a predetermined number of parent index blocks, the identified parent index blocks being selected in decreasing order from the parent index block having the highest imbalance.

8. The database management device according to claim 1, wherein the access counter is formed by a plurality of access counters so as to correspond to a plurality of storage areas, respectively, in a case where there occurs an access to any one of the plurality of index blocks, the access management unit updates an access counter belonging to the index block that has been accessed and corresponding to a storage area serving as a destination of access.

9. A non-transitory computer-readable storage medium that stores a program that manages a database containing a data block storing a table data and causes a computer to function as:
    a storage device storing a plurality of index blocks each of which is stored in a different contiguous storage space of a predetermined size from each other and includes a plurality of index entries, each of the index entry indentifying one piece of row data of the table data or identifying another index block, the plurality of index blocks constituting a tree structure, each of the index block being either a branch node or a leaf node of the tree structure, the storage device further storing an access counter for each index block that indicates a number of accesses to the corresponding index block; and
    an access management unit that updates the access counter of each of the plurality of index blocks accessed along the tree structure, said access being made in a manner such that the index entry is referred to in response to data manipulation to the table data.

10. A database management method that is performed by a computer and manages a database containing a data block storing table data,
    the computer including a storage device storing a plurality of index blocks each of which is stored in a different contiguous storage space of a predetermined size from each other and includes a plurality of index entries, each of the index entry identifying one piece of row data of the table data or identifying another index block, the plurality of index blocks constituting a tree structure, each of the index block being either a branch node or a leaf node, of the tree structure, the storage device further storing an access counter for each index block that indicates a number of accesses to the corresponding index block; and
    the database management method including:
    referring to the index entry in response to data manipulation to the table data; and
    updating the access counter of each of the plurality of index blocks accessed along the tree structure through the reference.

\* \* \* \* \*